United States Patent [19]

Katsuno et al.

[11] Patent Number: 4,682,790

[45] Date of Patent: Jul. 28, 1987

[54] WEBBING RETAINING STRUCTURE

[75] Inventors: Mitsuaki Katsuno; Toshio Gyoda; Hideki Tanaka; Kunihiro Hurumoto; Noritada Yoshitsugu; Kenji Matsui, all of Aichi, Japan

[73] Assignees: Kabushiki Kaisha Tokai-Rika-Denki-Seisakusho; Toyota Jidosha Kabushiki Kaisha, both of Aichi, Japan

[21] Appl. No.: 844,585

[22] Filed: Mar. 27, 1986

[30] Foreign Application Priority Data

Mar. 29, 1985 [JP] Japan ............................... 60-46252
Mar. 12, 1986 [JP] Japan ............................... 61-35733

[51] Int. Cl.⁴ .......................................... B60R 21/00
[52] U.S. Cl. ...................................... 280/801; 280/804
[58] Field of Search ............... 280/801, 808, 803, 804; 297/468, 483, 486

[56] References Cited

U.S. PATENT DOCUMENTS

| | | | |
|---|---|---|---|
| 4,375,897 | 3/1983 | Takada | 280/804 |
| 4,451,087 | 5/1984 | Tamamushi | 280/801 |
| 4,487,454 | 12/1984 | Biller | 280/804 |
| 4,607,863 | 8/1986 | Yokote | 280/804 |
| 4,611,854 | 9/1986 | Pfeiffer | 280/801 |

FOREIGN PATENT DOCUMENTS 2225011 10/1984 France ........................... 280/801
58-73260 5/1983 Japan .

*Primary Examiner*—Richard A. Bertsch
*Attorney, Agent, or Firm*—Sixbey, Friedman & Leedom

[57] ABSTRACT

A webbing retaining structure is employed in an automatic seatbelt system for a vehicle which is so designed that one end portion of a webbing which is closer to the outside of the vehicle is moved in the longitudinal direction of the vehicle, and the webbing is thereby automatically fastened to the body of an occupant. A first member which retains the end portion of the webbing is pivotally supported by a second member which is mounted on the vehicle body. A combination of a projection and recesses in which it is selectively fitted is provided between the first and second members. The angle at which the webbing is retained by the vehicle body can be adjusted by changing the position of combination between the projection and the recesses.

23 Claims, 14 Drawing Figures

WEBBING RETAINING STRUCTURE

BACKGROUND OF THE INVENTION

1. Field of the Invention

The present invention relates to a webbing retaining structure for use in an automatic seatbelt system for a vehicle. More particularly, the present invention pertains to a webbing retaining structure which enables a webbing to be fastened at an optimum position on the body of an occupant.

2. Description of the Related Art

There has already been proposed one type of automatic seatbelt system for vehicles designed to automatically fasten a webbing to the body of an occupant after he has been seated.

This type of automatic seatbelt system includes two forms of webbing retaining structure. One of them is a structure in which a webbing is retained at one end thereof by a door frame, and an occupant is fastened by and unfastened from the webbing in response to the movement of the door when closed and opened (this will be referred to as the door frame type structure, hereinafter). In the other form of structure, one end of a webbing is moved in the longitudinal direction of the vehicle body along a guide rail mounted in the vicinity of the roof side of the vehicle (this will be referred to as the guide rail type structure, hereinafter).

In these webbing retaining structures, one end of the webbing is disposed near the shoulders of the occupant who is in the webbing fastened condition, while the intermediate portion of the webbing is employed to restrain the body of the occupant, and the other end of the webbing is wound up into a retractor installed near the center console.

Therefore, it is preferable to arrange the webbing retaining portion near the shoulders of the occupant such that it is possible to adjust the angle at which the webbing extends from the webbing retaining portion toward the body of the occupant in accordance with the size of the occupant's body or the position of the seat.

To meet this demand, an automatic seatbelt system of the door frame type structure has already been disclosed in Japanese Utility Model Laid-Open No. 73260/1983.

However, if the webbing retaining portion is made rotatable with respect to the body of the vehicle, the number of required parts is increased, and the assembling operation is complicated, resulting in a lowering in working efficiency.

In addition, a complicated assembling operation leads to a reduction in the degree of accuracy in assembling, which makes it impossible to effect an appropriate adjustment of the webbing retaining angle.

SUMMARY OF THE INVENTION

In view of the above-described circumstances, it is a primary object of the present invention to provide a webbing retaining structure which facilitates the assembling operation and enables adjustment of the angle at which the webbing is retained.

To this end, the present invention provides a webbing retaining structure for use in an automatic seatbelt system for a vehicle, comprising: a first support member for retaining one end of an occupant restraining webbing the other end of which is wound up into a retractor; a second support member secured to the body of the vehicle and adapted to pivotally support the first support member; and retaining means including a projection provided on either one of the first and second support members and a plurality of recesses provided in the other of the two so as to be spaced around the axis of rotation of the support member such that the projection selectively enters the recesses, whereby the angle at which the webbing is supported by the body of the vehicle can be adjusted by changing the positional relationship between the projection and the recesses.

By virtue of this arrangement, it is possible to obtain an optimum webbing fastened condition in accordance with the size of each individual occupant's body by turning the first support member relative to the second support member against biasing force and thereby changing the position of the webbing at which it is retained by the second support member.

In addition, it is possible to simplify the structure, improve the assembling efficiency, and increase the degree of accuracy in assembling operation.

DESCRIPTION OF THE PREFERRED EMBODIMENTS

The present invention will be described hereinunder in detail with reference to the accompanying drawings.

Figure 1:
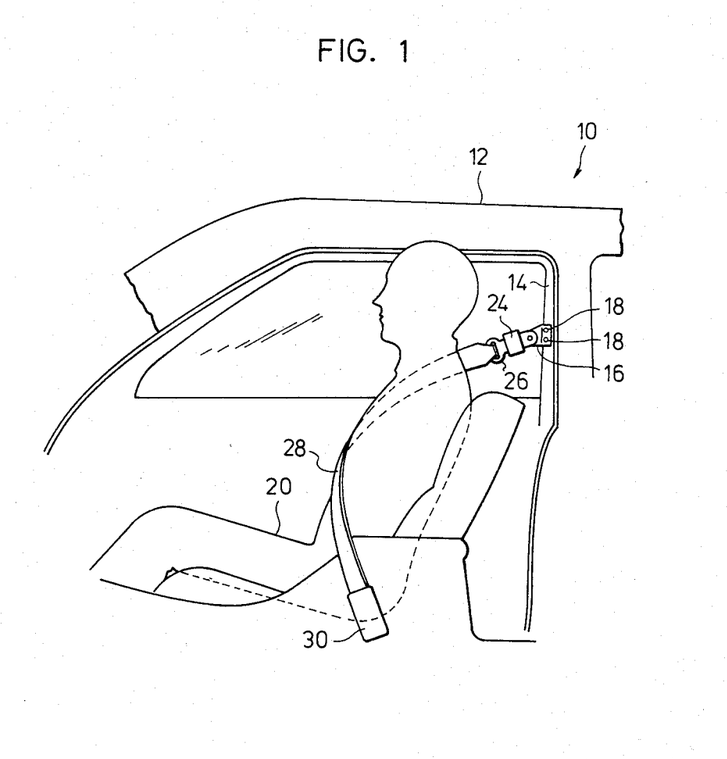
FIG. 1 is a side view of an automatic seatbelt system to which a first embodiment of the webbing retaining structure according to the present invention is applied.

FIG. 1 shows an automatic seatbelt system 10 to which a first embodiment of the webbing retaining structure according to the present invention is applied.

This seatbelt system 10 has the door frame type structure in which an anchor plate or support member 16 is secured to a part of a door frame 14 of a vehicle 12 by using two bolts 18.

Figure 2:
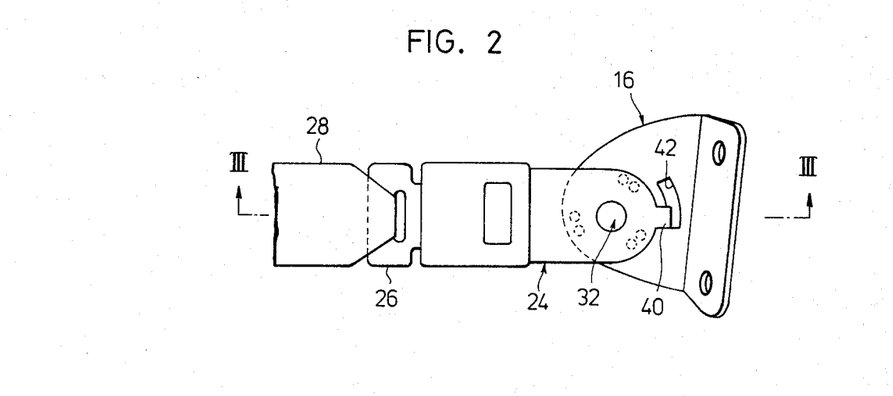
FIG. 2 is a plan view of an anchor plate and a buckle in accordance with the first embodiment, which shows the way in which the buckle is retained by the anchor plate.
Figure 3:
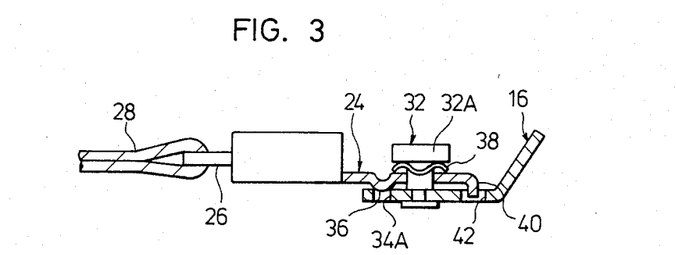
FIG. 3 is a sectional view taken along the line III—III in FIG. 2.
Figure 4:
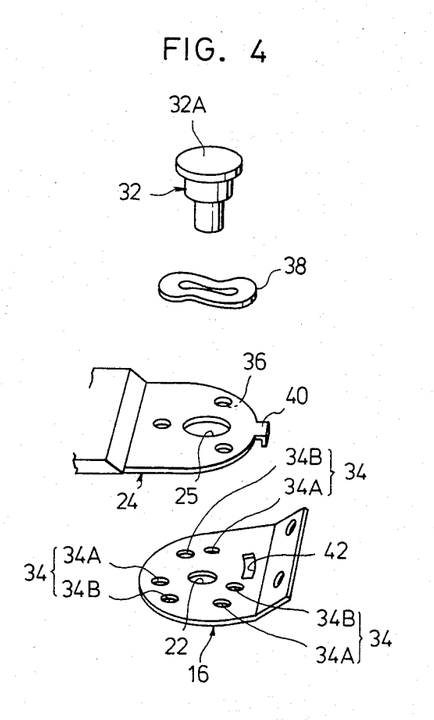
FIG. 4 is an exploded perspective view of a selector mechanism in accordance with the first embodiment.

As shown in FIGS. 2 to 4, the anchor plate 16 is bent at the intermediate portion thereof toward the shoulders of an occupant 20, so that the anchor plate 16 has a substantially L-shaped configuration.

A circular bore 22 is provided in the bent portion of the anchor plate 16. A buckle or another support member 24 is provided in one end portion thereof with a circular bore 25 which has a larger diameter than that of the bore 22, the bore 25 being disposed coaxially with the bore 22.

The buckle 24 is provided in the other end portion thereof with an opening for insertion of a tongue plate 26. The tongue plate 26 retains one end of a webbing 28. The other end portion of the webbing 28 is wound up into a retractor 30 installed near the center console of the vehicle 12. The intermediate portion of the webbing 28 is used to fasten the body of the occupant 20.

A rivet 32 is inserted into the two circular bores 25 and 22 in such a manner that the distal end thereof projects from the other side, and this end portion of the rivet 32 is caulked. The diameter of the intermediate portion of the rivet 32 is equal to the diameter of the circular bore 25, and the distal end portion of the rivet 32 has the same diameter as that of the circular bore 22. In other words, the rivet 32 has a stepped shank.

Accordingly, even after the rivet 32 has been caulked, the clearance between the lower side of the head 32A of the rivet 32 and the upper side of the anchor plate 16 is larger than the thickness of the buckle 24.

The anchor plate 16 is provided with six recesses 34 around the axis of rotation of the buckle 24. The recesses 34 are arranged such that three pairs of recesses 34A and 34B are spaced equally around the circumference about the axis of rotation of the buckle 24, each pair of recesses 34A and 34B being disposed adjacent to each other. Three projections 36 are provided on the buckle 24 so as to oppose the three recesses 34A. The projections 36 are respectively fitted in the recesses 34A. When the buckle 24 is turned, the projections 36 come out of the recesses 34A and enter the recesses 34B, respectively.

In addition, a flat spring 38 is disposed between the head 32A of the rivet 32 and the buckle 24, so that the buckle 24 is biased toward the anchor plate 16.

In consequence, the projections 36 can selectively enter either the recesses 34A or 34B to maintain a condition of the buckle 24 in which it is retained by the anchor plate 16. When the occupant 20 turns the buckle 24, the projections 36 come out of the recesses 34A against the biasing force from the flat spring 38 and enter the recesses 34B, respectively and, at this time, he can feel the registration between the projections 36 and the recesses 34B.

The outer periphery of the buckle 24 is provided with a projection 40 which is bent so as to extend toward the anchor plate 16. The projection 40 is fitted in a circular bore 42 provided in the anchor plate 16.

Accordingly, the range within which the buckle 24 can pivot with respect to the anchor plate 16 is limited to the length of the circular bore 42.

The flat spring 38 is not necessarily limitative, and it is possible to employ any other type of biasing member, provided that it is able to bias the buckle 24 toward he anchor plate 16, such as a compression coil spring (not shown) or a resilient resin ring.

When the occupant 20 opens the door in order to enter the vehicle, the webbing 28 which is secured at one end thereof to the door frame 14 is separated from the seat in response to the opening movement of the door, so that a sufficiently large space is ensured for the occupant 20 when entering the vehicle.

When the occupant 20 closes the door after seating himself, the webbing 28 is wound up into the retractor and, while doing so, the webbing 28 restrains the body of the occupant 20 by the intermediate portion thereof, thus bringing the occupant 20 into a webbing fastened condition.

Since the buckle 24 is able to pivot with respect to the anchor plate 16, the occupant 20 can adjust the webbing 28 so as to be fastened at an optimum position on the body of the occupant 20 by turning the buckle 24.

More specifically, the buckle 24 is first in a state wherein the projections 36 of the buckle 24 are fitted in the recesses 34A and held in this condition by means of the biasing force of the flat spring 38, and the occupant 20 turns the buckle 24 in this state against the force of the spring 38.

As the buckle 24 is turned, the projections 36 come out of the recesses 34A and, when reaching the recesses 34B, they are fitted into these recesses 34B by means of the force of the spring 38.

Thus, it is possible to easily obtain an optimum webbing fastened condition which takes account of the size of the occupant's body by selectively turning the buckle 24 so that the projections 36 are fitted into either the recesses 34A or 34B by means of the biasing force of the flat spring 38.

Since the buckle 24 is retained through three projections 36, there is no risk of any chattering or play occurring in the retained state, and the required biasing force from the flat spring 38 is relatively small.

Figure 5:
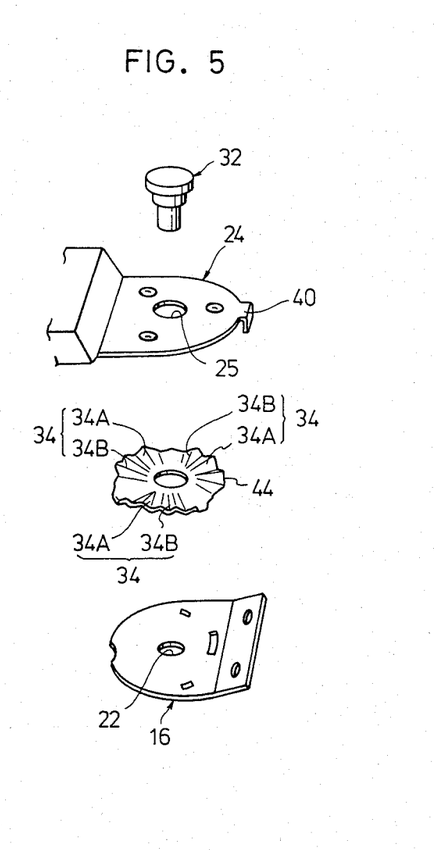
FIG. 5 is an exploded perspective view of another selector mechanism in accordance with the first embodiment.

Although, in this embodiment, the recesses 34 with which the projections 36 of the buckle 24 are engaged are provided directly on the anchor plate 16, a plate 44 which has radial corrugations (as shown in FIG. 5) may be secured to the anchor plate 16 in place of the recesses 34. In this case, the flat spring 38 is unnecesssary, since the plate 44 has resilience.

The following is a description of a second embodiment in which the present invention is applied to an automatic seatbelt system of the guide rail type structure.

Figure 6:
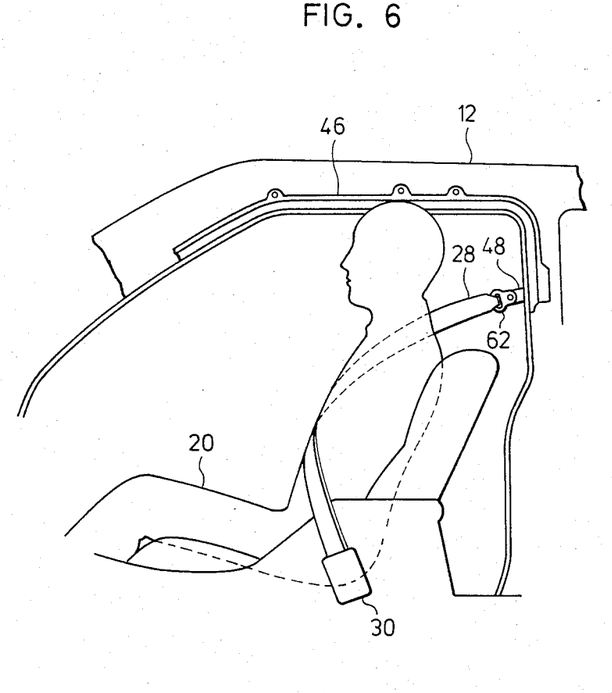
FIG. 6 is a side view of an automatic seatbelt system to which a second embodiment of the webbing retaining structure according to the present invention is applied.

Referring to FIG. 6, a guide rail 46 is secured to the roof side of the vehicle 12.

The rear end portion of the guide rail 46 is bent so as to extend toward the floor of the vehicle 12 along the center pillar. The lower end face of the guide rail 46 is provided with a groove (not shown) into which a slider or support member 48 is inserted.

The slider 48 is fitted in flexible tape (not shown) within the groove, so that the slider 48 reciprocates between the front and rear ends of the guide rail 46 in response to the movement of this tape in the longitudinal direction of the vehicle.

Figure 7:
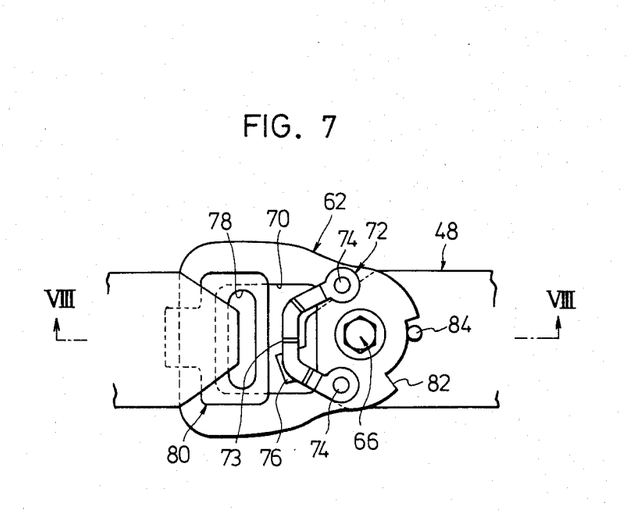
FIG. 7 is a plan view of a slider and a shoulder anchor plate in accordance with the second embodiment, which shows the way in which the shoulder anchor plate is retained by the slider.
Figure 8:
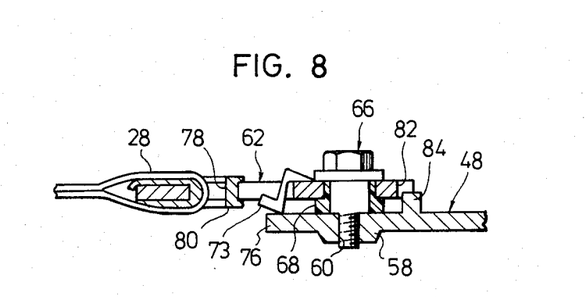
FIG. 8 is a sectional view taken along the line VIII—VIII in FIG. 7.
Figure 9:
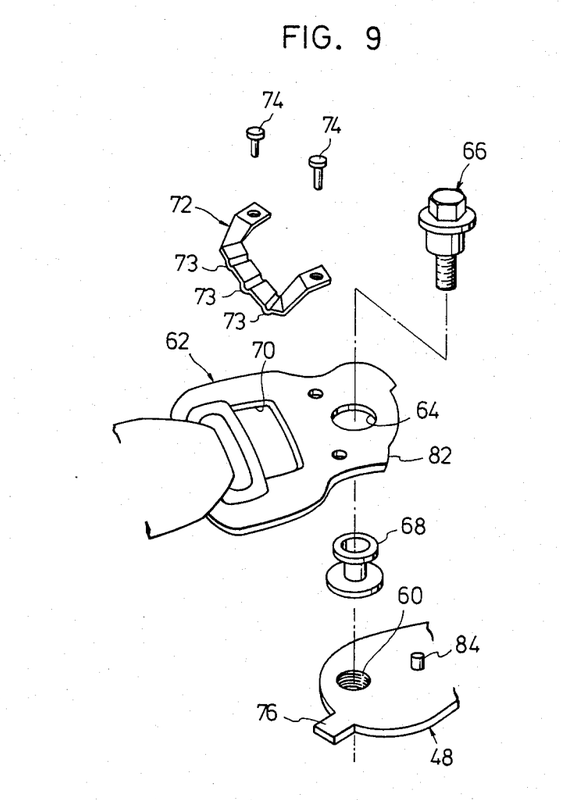
FIG. 9 is an exploded perspective view of a selector mechanism in accordance with the second embodiment.

As shown in FIGS. 7 to 9, a portion of the slider 48 has a relatively large thickness so as as to provide a thick-walled portion 58 which is provided with an internally-threaded portion 60.

A shoulder anchor plate or another support member 62 is provided with a circular bore 64 having a larger diameter than the diameter of the internally-threaded portion 60, the bore 64 being disposed coaxially with the portion 60. A stepped bolt 66 is inserted through the circular bore 64 and screwed into the internally-threaded protion 60.

The intermediate portion of the stepped bolt 66 has the shape of a column the diameter of which is smaller than that of the circular bore 64 but larger than that of the internally-threaded portion 60. Thus, the shoulder anchor plate 62 is pivotally supported by the bolt 66 through the bore 64 and a spacer 68. The outer diameter of the spacer 68 is enlarged at a portion thereof which is interposed between the slider 48 and the shoulder anchor plate 62, thus preventing direct contact between the slider 48 and the anchor plate 62.

The shoulder anchor plate 62 is provided with a rectangular bore 70. The intermediate portion of a flat spring 72 is disposed in one end of the bore 70.

As will be clear from FIG. 9, the intermediate portion of the flat spring 72 is provided with three protuberances 73 which project toward the slider 48. Each pair of adjacent protuberances 73 define a recess for engagement with the slider 48. The flat spring 72 is bent such as to have a substantially U-shaped configuration. Both end portions of the spring 72 are secured to the end face of the shoulder anchor plate 62 by rivets 74 the distal ends of which are caulked.

The end of the slider 48 is provided with a projection 76 which constitutes a part of a retaining means and opposes the three protuberances 73. The width of the projection 76 is equal to the spacing between each pair of adjacent protuberances 73.

Thus, when the occupant 20 turns the shoulder anchor plate 62 about the stepped bolt 66, the central protuberance 73 moves from one side of the projection 76 to the other side and, at this time, the occupant 20 can feel the registration between one recess and the projection 76.

In addition, a webbing protector 80 having a slot 78 is engaged with the rectangular bore 70. The webbing 28 is retained by the shoulder anchor plate 62 through this protector 80.

Further, a circular notch 82 is provided in the outer periphery of a portion of the shoulder anchor plate 62 which opposes the slider 48, the notch 82 opposing a pin 84 provided on the slider 48.

Accordingly, the pin 84 serves as a stopper, and the range within which the shoulder anchor plate 62 can pivot is limited to the angle made between two extremities of the circular notch 82.

By virtue of the above-described arrangement, it is possible to obtain an optimum webbing fastened position in accordance with the size of the occupant's body by adjusting the webbing retaining angle in a manner similar to that in the first embodiment.

When the shoulder anchor plate 62 and the slider 48 are assembled together, the anchor plate 62 can be rotatably mounted simply by screwing the stepped bolt 66 into the internally-threaded portion 60. In addition, it is possible to allow the occupant to feel the registration between the projection and a selected recess when turning the anchor plate 62 for adjustment of the angle.

Although the rivet 32 and the stepped bolt 66 are employed in the first and second embodiments, respectively, they may be interchanged with each other.

In addition, although three protuberances 73 are provided in the second embodiment, it is possible to sufficiently retain the shoulder anchor plate 62 by the central protuberance 73 alone.

As has been described above, the webbing retaining structure according to the present invention comprises: a first support member for retaining one end of an occupant restraining webbing the other end of which is wound up into a retractor; a second support member secured to the body of the vehicle and adapted to pivotally support the first support member; and retaining means including a projection provided on either one of the first and second support members and a plurality of recesses provided in the other of the two so as to be spaced around the axis of rotation of the support member such that the projection selectively enters the recesses, whereby the angle at which the webbing is supported by the body of the vehicle can be adjusted by changing the positional relationship between the projection and the recesses. It is therefore possibloe to simplify the assembling operation and adjust the webbing retaining angle.

Figure 10:
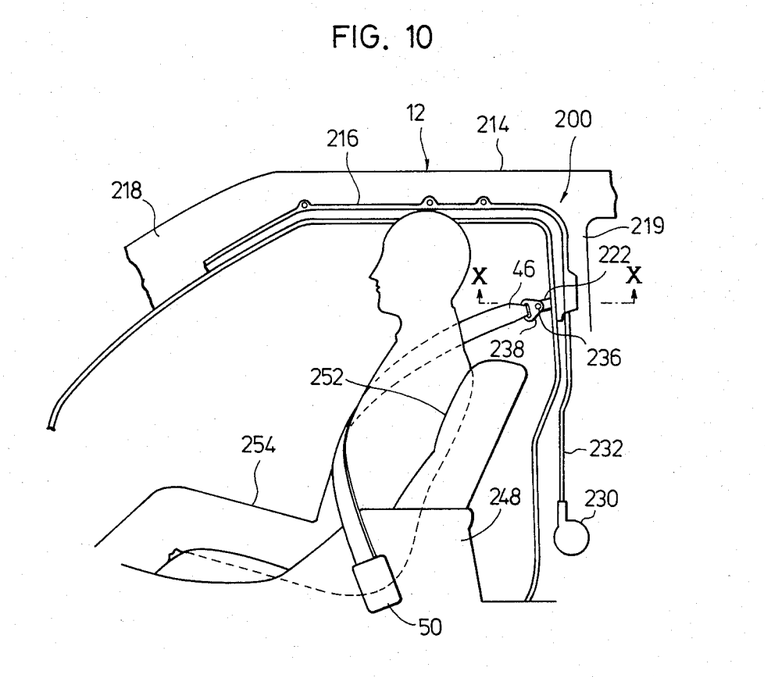
FIG. 10 is a side view of an automatic seatbelt system to which a third embodiment of the webbing retaining structure according to the present invention is applied.

Referring next to FIG. 10, there is shown an automatic seatbelt system 200 to which a third embodiment of the webbing retaining structure according to the present invention is applied. This automatic seatbelt system 200 is also of the guide rail type.

A guide rail 216 is secured near a roof side member 214 of the vehicle 12. The front end portion of the guide rail 216 is disposed along a front pillar 218.

The rear end portion of the guide rail 216 is bent at substantially right angles so as to extend along a center pillar 219.

Figure 11:
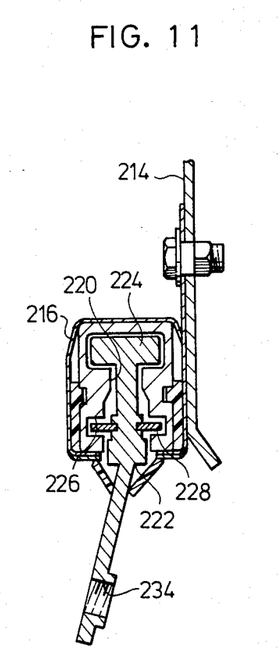
FIG. 11 is a sectional view taken along the line X—X in FIG. 10.

As shown in FIG. 11, a groove 220 is formed inside the guide rail 216. The width of the bottom portion of this groove 220 is enlarged so that the head portion 224 of a slider or support member 222 is accommodated within the bottom portion. The intermediate portion of the groove 220 defines a tape accommodating groove 226 which accommodates a flexible tape 228.

The distal end of the tape 228 is secured to the intermediate portion of the slider 222, while the proximal end of the tape 228 is wound up onto a take-up reel 230 which is disposed at the lower side of the center pillar 219 and which is rotated by driving means (not shown).

A tape guide cover 232 is disposed between the take-up reel 230 and the guide rail 216, so that the flexible tape 228 passes through the inside of this cover 232.

The intermediate portion of the slider 222 is provided with an internal thread 234 at which a webbing retaining plate or support member 238 is pivotally supported through a stepped bolt 236. A spacer 242 is interposed between the outer periphery of the bolt 236 and the inner periphery of a circular bore 240 provided in the plate 238 in order to facilitate the relative rotation between the slider 222 and the plate 238.

The webbing retaining plate 238 is provided with a slit 244 through which one end of a webbing 46 is retained.

The other end portion of the webbing 46 is wound up into a retractor 50 which is secured to the floor surface near a center console 248 disposed in the center of the vehicle body, in a manner similar to that in the above-described embodiments.

When the take-up reel 230 is rotated forwardly by the force derived from the driving means, a pulling force is applied to the flexible tape 228 within the tape guide cover 232. In consequence, the slider 222, together with the tape 228, is moved toward the rear end of the vehicle, whereby an occupant 254 seated in a seat 252 can be brought into a webbing fastened condition.

When the take-up reel 230 is reversed by means of the force applied thereto from the driving means, a compressive force is applied to the flexible tape 228 within the tape guide cover 232, so that the slider 222 is moved toward the front end of the vehicle.

Thus, a space which enables the occupant 254 to enter and leave the vehicle is provided between the webbing 46 and the seat 252.

In the automatic seatbelt system 200 according to this embodiment, the angle of relative rotation between the slider 222 and the webbing retaining plate 238 can be changed in accordance with the body size of the occupant seated in the seat 252. The structure for changing the webbing angle will be explained below.

Figure 12:
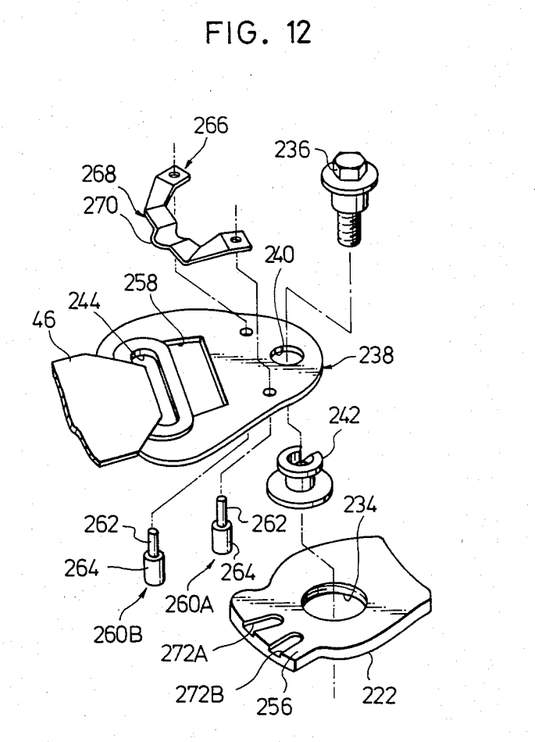
FIG. 12 is an exploded perspective view of a selector mechanism in accordance with the third embodiment.

Referring to FIG. 12, a radially projecting portion 256 is integrally formed at a portion of the outer periphery of the slider 222. This projecting portion 256 opposes a rectangular bore 258 which is provided in the webbing retaining plate 238 and adjacent to the slit 244.

Two rivets 260A and 260B which respectively constitute projecting portions are mounted around the axis of rotation of the webbing retaining plate 238. Each of the rivets 260A and 260B is constituted by a smaller-diameter portion 262 and a larger-diameter portion 264 which defines a limiting means. The smaller-diameter portions 262 are fitted through the webbing retaining plate 238 from the end face thereof which opposes the slider 222.

Thus, the larger-diameter portions 264 of the rivets 260A and 260B are respectively disposed at two points on the locus of the pivotal movement of the projecting portion 256 about the stepped bolt 236, thereby limiting the rotation of the projecting portion 256.

Two end portions of a flat spring 266 which constitutes a retaining means are fitted onto the smaller-diameter portions 262 of the rivets 260A and 260B.

The flat spring 266 has a substantially U-shaped planar configuration, and the intermediate portion thereof is projected toward the rectangular bore 258 so as to define a retaining portion 268.

Figure 14:
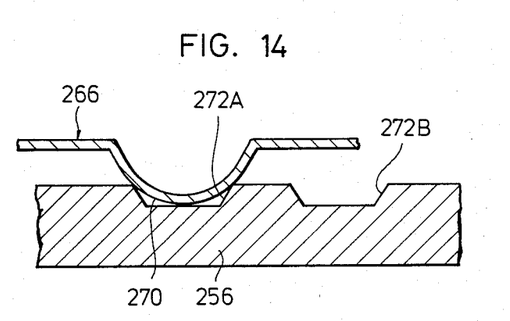
FIG. 14 is a sectional view showing the engagement between a projection and one of the recesses in accordance with the third embodiment.

A projection 270 having a circular cross-section is formed on the retaining portion 268 so as to oppose recesses 272A and 272B formed in the projecting portion 256. The recesses 272A and 272B are respectively provided at two positions on the projecting portion 256 such that, when the webbing retaining plate 238 pivots about the stepped bolt 236, the projection 270 selectively enters the recesses 272A and 272B, whereby it is possible to retain the webbing retaining plate 238 at a predetermined angle with respect to the slider 222 by virtue of the resilience of the projection 270. The recesses 272A and 272B preferably have slanted side surfaces, as shown in FIG. 14.

Figure 13:
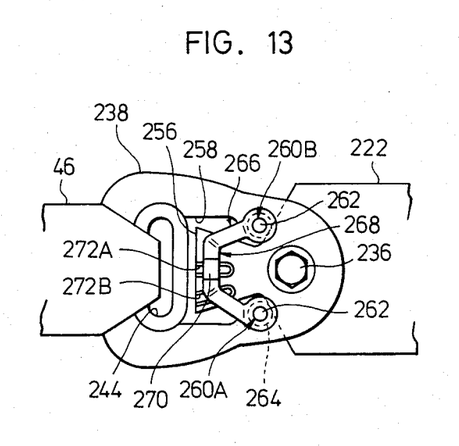
FIG. 13 is a plan view of the slider and the webbing retaining plate shown in FIG. 12.

Thus, the webbing retaining plate 238 is retained by the slider 222 without any play or chattering.

The operation of this embodiment will be described below.

When the occupant 254 opens the door to enter the vehicle, he can readily be seated in the seat 252, since a sufficiently large space is ensured between the webbing 46 and the seat 252.

When the take-up reel 230 is rotated forwardly by the force derived from the driving means, the flexible tape 228 is pulled within the tape guide cover 232, so that the tape 228 is moved toward the rear end of the vehicle along the guide rail 216.

In response to this movement of the tape 228, the webbing 46 retained by the slider 222 is moved, thus enabling the occupant 254 to be brought into a webbing fastened condition.

To unfasten the webbing 46, the take-up reel 230 is reversed by means of the force from the driving means. In consequence, a compressive force is applied to the flexible tape 228 within the tape guide cover 232, and the tape 228 is thereby moved toward the front end of the vehicle while pulling one end of the webbing 46 toward the forward end of the guide rail 216, thereby allowing the occupant 254 to leave the vehicle.

When an occupant having a different body size from that of the occupant 254 seats himself in the seat 252 and fastens the webbing 46, it is possible to change the angle at which the webbing retaining plate 238 is retained by the slider 222 so that an optimum webbing fastened condition is obtained.

More specifically, the angle of relative rotation between the webbing retaining plate 238 and the slider 222 is maintained through the engagement between the projection 270 and either the recess 272A or 272B. Since the recesses 272A and 272B are provided at two positions, when the webbing retaining plate 238 is pivoted about the stepped bolt 236, the retaining portion 268 of the flat spring 266 is elastically deformed to come out of the recess 272A. When, in this state, the retaining portion 268 is shifted so as to oppose the other recess 272B, the shape of the retaining portion 268 is restored and retained by the recess 272B, and the webbing retaining plate 238 is thereby held by the slider 222 at an angle different from the previous angle.

Thus, the webbing 46 can be fastened at an optimum position on the body of the occupant having a different body size.

When the projection 270 is retained by either the recess 272A or 272B, the webbing retaining plate 238 is supported by either the recess 272A or 272B by virtue of the resilience of the projection 270. It is therefore possible to reliably retain the plate 238 without any play or chattering.

In addition, the rivets 260A and 260B serve as stoppers for preventing any over-swing of the webbing retaining plate 238 and also function as members for mounting the flat spring 266. For this reason, the number of required parts is reduced, and the assembling efficiency is improved.

As has been described above, the webbing retaining structure according to the present invention comprises: a first support member for retaining one end of an occupant restraining webbing; a second support member secured at one end thereof to the body of a vehicle and connected at the other end thereof to the first support member so as to be movable relative to it; limiting means including a radially projecting portion provided on either one of the first and second support members and two projecting portions which extend through both end faces of the other of the two and which are respectively disposed at two points on the locus of the pivotal movement of the radially projecting portion, thereby limiting the relative rotation between the first and second support members; and retaining means including a projection provided on either one of the first and second support members and a plurality of recesses provided in the radially projecting portion such that the projection selectively enters the recesses, whereby the angle of relative rotation between the first and second support members is made adjustable. Thus, the assembling operation is facilitated, and the angle at which the webbing is retained is made adjustable.

What is claimed is:

1. A webbing retaining structure for use in an automatic seatbelt system for a vehicle so designed that one end portion of an occupant restraining webbing which is closer to the outside of the vehicle is moved in the longitudinal direction of the vehicle when an occupant enters or leaves the vehicle, thereby automatically fastening said webbing to the occupant's body, said structure being adapted for supporting said end portion of said webbing on the body of the vehicle, and comprising:
   (a) a first support member for retaining said end portion of said webbing;
   (b) a second support member secured to the vehicle body and pivotally supporting said first support member; and
   (c) retaining means including a projection provided on either one of said first and second support members and a plurality of recesses provided in the other of the two so as to be spaced around the axis of rotation of the support member such that said projection selectively enters said recesses solely by the application of torque to said first support member, said projection and said recesses facing each other in a direction parallel to the axis for rotation of the first support member, whereby the angle at which said webbing is supported by the vehicle body can be discretely adjusted by changing the positional relationship between said projection and said recesses.

2. A webbing retaining structure according to claim 1, wherein a plurality of said pojections are provided around the axis of rotation of said support member.

3. A webbing retaining structure according to claim 2, wherein a plurality of said recesses are provided so as to oppose each of said plurality of projections.

4. A webbing retaining structure according to claim 1, further comprising:
   a resilient member for biasing said projection toward said recesses.

5. A webbing retaining structure according to claim 1, further comprising:
   means provided between said first and second support members for limiting the angle of relative rotation between said support members.

6. A webbing retaining structure according to claim 5, wherein said limiting means includes a projection projecting from either one of said first and second support members and a recess provided in the other of the two for accommodating this projection in such a manner as to be movable a predetermined distance.

7. A webbing retaining structure according to claim 1, wherein said recesses are constituted by radial corrugations formed on a plate mounted on the other of the two support members.

8. A webbing retaining structure according to claim 7, wherein said plate has resilience and serves to bias said projection toward said recesses.

9. A webbing retaining structure for use in an automatic seatbelt system for a vehicle so designed that one end portion of at occupant restraining webbing which is closer to the outside of the vehicle is moved in the longitudinal direction of the vehicle when at occupant enters or leaves the vehicle, thereby automatically fastening said webbing to the occupant's body, said structure being adapted for supporting said end portion of said webbing on the body of the vehicle, and comprising:
   (a) a first support member for retaining said end portion of said webbing,
   (b) a secodn support member secured to the vehicle body and pivotally supporting said first support member; and
   (c) retaining means including a projection provided on either one of said first and second support members and a plurality of recesses provided in the other of the two so as to be spaced around the axis of rotation of the support member such that said projection selectively enters said recesses, whereby the angle at which said webbing is supported by the vehicle body can be adjusted by changing the positional relationship between said projection and said recesses, and wherein said projection is provided on said second support emmber, and said recesses are provided in the intermediate portion of a flat spring which is secured at both ends thereof to said first support member, whereby, when said first and second support members are assembled together, it is possible to assemble said flat spring together with then by mounting said flat spring or said first support member in advance and then mounting said first support member to said second support member.

10. A webbing retaining structure according to claim 9, wherein said flat spring is provided with a plurality of protuberances projecting toward said projection, said recesses being each defined between each pair of adjacent protuberances.

11. A webbing retaining structure according to claim 10, wherein both end portions of said flat spring are secured to the side of said first support member which is remote from second support member, while the intermediate portion of said flat spring opposes said projection on said second support member through a bore provided in said first support member.

12. A webbing retaining structure employed in an automatic seatbelt system for a vehicle to support the driven side of an occupant restraining webbing on the body of the vehicle, said structure comprising:
   (a) a first support plate for supporting one end portion of said webbing on the driven side thereof;
   (b) a second support plate mounted on the vehicle body and adapted to pivotally support said first support plate;
   (c) retaining means including a projection projecting from one of said support plates toward the other, and a plurality of recesses provided in said other support plate so as to be spaced around said pivotally supporting portion such that said projection is selectively fitted into said recesses, said projection and said recesses facing each other in the direction parallel to the pivoting axis of the pivotally supported portion; and
   (d) means for biasing said projection in a direction in which it enters one of said recesses, whereby the angular position of said webbing in which it is fastened to the occupant's body is discretely chasnged solely by the application of a pivoting force on said first plate with respect to said second support plate.

13. A webbing retaining structure according to claim 12, wherein a plurality of said projections are provided around the axis of rotation of said support plate.

14. A webbing retaining structure according to claim 13, wherein a plurality of said recesses are provided so as to oppose each of said plurality of projections.

15. A webbing retaining structure according to claim 12, further comprising:
 means provided between said first and second support plates for limiting the angle of relative rotation between said support plates.

16. A webbing retaining structure according to claim 15, wherein said limiting means includes a projection projecting from either one of said first and second support plates and a recess provided in the other of the two for accommodating this projection in such a manner as to be movable a predetermined distance.

17. A webbing retaining structure according to claim 12, wherein said recesses are constituted by radial corrugations formed on a plate mounted on the other of the two support plates.

18. A webbing retaining structure for use in an automatic seatbelt system for a vehicle so designed that one end portion of an occupant restraining webbing which is closer to the outside of the vehicle is moved in the longitudinal direction of the vehicle, thereby automatically fastening said webbing to the body of an occupant, said structure enabling adjustment of the angle at which said webbing is retained, and comprising:
 (a) a first member forretaining said end portion of said webbing;
 (b) a second member pivotally supporting said first member and mounted on the body of the vehicle as well as applying force to said webbing through said first member for moving said webbing so as to be fastened to the occupant's body;
 (c) retaining means including a flat spring secured at both ends to said first member, and a projection which projects from said second member so as to oppose a plurality of recesses provided in the intermediate portion of said flat spring, whereby the position of said webbing in which it is fastened to the occupant's body can be adjusted by changing the position of said projection in relation to said recesses.

19. A webbing retaining structure according to claim 18, wherein said flat spring is secured to the side of said first member which is remote from said second member, and the intermediate portion of said flat spring opposes said first member through a bore provided in said second member.

20. A webbing retaining structure according to claim 18, wherein either one of said first and second members is provided with a projection, and the other of the two is provided with a notch for receiving this projection so as to be movable a predetermined distance, thereby limiting the angle of relative rotation between said first and second members.

21. A webbing retaining structure for use in an automatic seatbelt system for a vehicle so designed that one end portion of an occupant restraining webbing which is closer to the outside of the vehicle is moved in the longitudinal direction of the vehicle, thereby automatically fastening said webbing to the body of an occupant, said structure enabling adjustment of the angle at which said webbing is retained, and comprising:
 1(a) a first member for retaining said end portion of said webbing;
 1(b) a second member pivotally supporting said first member and mounted on the body of the vehicle as well as applying force to said webbing through said first member for moving said webbing so as to be fastened to the occupant's body; and
 1(c) retaining means including a projection provided on a flat spring secured at both ends thereof to said first member, and a plurality of recesses provided on said second member such that said projection selectively enters said recesses, whereby the position of said webbing at which it is fastened to the occupant's body can be adjusted by changing the position of said pojection in relation to said recesses.

22. A webbing retaining structure according to claim 21, wherein said flat spring is secured to the side of said first member which is remote from said second member, and the intermediate portion of said flat spring opposes said recesses provided in said second member through a bore provided in said member.

23. A webbing retaining structure for use in an automatic seatbelt system for a vehicle so designed that one end portion of an occupant restraining webbing which is closer to the outside of the vehicle is moved in the longitudinal direction of the vehicle when an occupant enters or leaves the vehicle, thereby automatically fastening said webbing to the occupant's body, said structure being adapted for supporting said end portion of said webbing ont eh body of the vehicle, and comprising:
 (a) a first support member for retaining said end portion of said webbing;
 (b) a secodn support member secured to the vehicle body and pivotally supporting said first support member; and
 (c) retaining means pivotally connecting said first and second support members which is operable solely by the application of a pivoting force to the first support member and which allows the angle at which said webbing is support by the vehicle body to be adjusted in discrete angular increments, wherein said retaining means includes means for biasing said first support member into said discrete angular, increments with respect to said second supppot member.

* * * * *